Feb. 5, 1952 A. R. HOWELL 2,584,878
CONSTANT PRESSURE CYCLE CONTINUOUS FLOW COMBUSTION
GAS TURBINE POWER PLANT
Filed Jan. 31, 1945
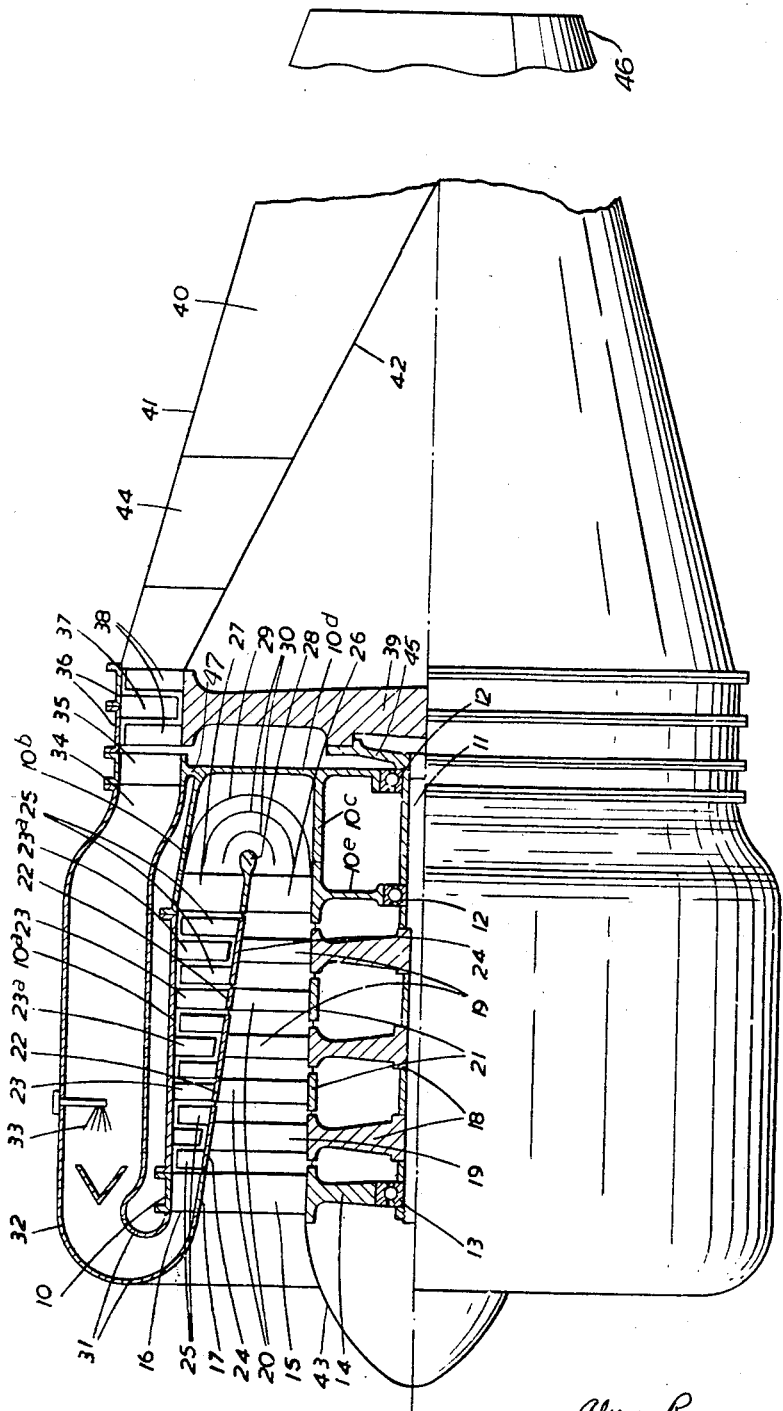
Inventor
Alun Raymond Howell
By
Loyd Hall Sutton
Attorney Patented Feb. 5, 1952

2,584,878

UNITED STATES PATENT OFFICE 2,584,878

CONSTANT PRESSURE CYCLE CONTINUOUS FLOW COMBUSTION GAS TURBINE POWER PLANT

Alun Raymond Howell, Neath, England, assignor to Power Jets (Research and Development) Ltd., London, England, a British company Application January 31, 1945, Serial No. 575,537
In Great Britain January 31, 1944

11 Claims. (Cl. 60—35.6)

This invention relates to internal combustion turbine power plants of the kind in which air is compressed in a compressor, delivered into combustion chamber means into which fuel is injected and continuously burnt at constant pressure and then expanded to a lower pressure in a turbine which drives the compressor.

The invention especially contemplates the application of power plants of the kind above referred to as prime movers in aircraft, but is applicable to power plants intended for other purposes as well.

More particularly, the invention relates to power plants of the kind herein first referred to, having compressors of the axial flow type, and an object of the invention is the attainment of higher compression ratios than have hitherto been generally employed, a further object being the attainment of such increased compression ratios without increasing the axial length of the compressor and the overall bulk of the power plant generally.

The invention also has a general object the provision of a power plant of the kind first herein referred to, of compact form, well adapted for installation as an aircraft prime mover, preferably of the jet reaction type, in which the weight of the structural and moving parts is minimised.

How the foregoing objects are attained and others as may hereinafter appear, and how the invention may be performed will be understood from the following description given by way of example, of an embodiment of the invention, whose scope is defined in the appended claims. This description has reference to the accompanying drawing, showing in half axial section an internal combustion turbine power-plant or unit intended for installation as a jet propulsion motor, in an aircraft whose direction of flight is from right to left in the drawing.

The thermodynamic cycle of the working fluid comprising compression, combustion, expansion and expulsion occurs within a continuous duct extending from a forward facing annular intake receiving atmospheric air to a rearward facing jet nozzle through which the exhaust gases are expelled; this duct has two 180° bends giving two complete reversals of flow, the sections of the duct adjacent said bends being coaxially nested.

In the drawing, the stationary structure of the unit comprises a built-up casing and a forward diaphragm 14. The casing comprises a number of ring elements 10, 10a, 10b, constituting a compressor stator casing and a pair of rear diaphragms, 10d, 10e, which with an inner ring element 10c are integral with the rearmost casing ring element 10b.

The last named diaphragms 10d, 10e house bearings 12 and the forward diaphragm 14 houses a bearing 13 in which bearings a main shaft 11 is rotatably supported.

The foremost casing element of the casing 10 is connected to the diaphragm 14 by integral radial webs constructed in two tiers 15, 16 separated by an integral intermediate ring 17, while the casing elements 10b, 10c likewise are connected by two-tier radial webs 26, 27 supporting an integral intermediate ring 28.

Keyed to the shaft 11 are a number of compressor rotor wheels 18 carrying radial blades 19 which co-operate with stator blades 20, whose mounting is hereinafter described, to constitute a low pressure axial flow boosting fan, whereby the first stages of compression are accomplished.

The outer extremities of the rotor blades 19 are integral with or secured to shroud rings 24, which together with shroud rings 22 similarly secured to the stator blades 20 and with the rings 17, 28 constitute a substantially continuous outer boundary of the annular duct in which the rotor and stator blades 19, 20 operate; the inner boundary of this duct being constituted by the rims of the diaphragm 14 and rotor wheels 18, the casing element 10c and shroud rings 21 secured to the inner extremities of stator blades 20.

The webs 15, 26 act respectively as entry and exit guide vanes to the booster fan and the air delivered thereby is received by an annular diffusion chamber bounded by a curved closure wall 29 spanning the space between the casing elements 10b, 10c. The curved wall 29 and guide elements 30 arranged parallel thereto operate to reverse the direction of flow through 180° and deliver it to the compressor proper, which consists of rotor blades 25 mounted on the exterior of shroud rings 24 and stator blades 23, 23a projecting inwardly from the outer portion of casing member 10a, which forms the outer boundary of the annular compressor duct, whose inner boundary is constituted by the shroud rings 24, 22 and rings 17, 28. Alternate rows 23 of stator blades are secured to the stationary shroud rings 22 and thus serve to support the stator blades 20 and inner shroud rings 21 of the booster fan, while the intermediate rows 23a of compressor stator blades lie between the paired compressor rotor blades 25 mounted on each rotary shroud ring 24.

The webs 27, 16 act respectively as entry and exit guide vanes to the compressor proper and it will be seen that the annular ducts of the booster fan and compressor proper form together a coaxial contra-flow system, whose entry is within and in the same place as its exit.

From the compressor exit proceeds an outwardly recurved annular transfer duct 31 leading to an annular combustion chamber 32 containing fuel injection nozzles 33. The combustion chamber is external to and coaxial with the compressor casing and the direction of flow is again reversed through 180° in the transfer duct 31.

The latter and the combustion chamber 32 may be replaced by a number of circumferentially spaced transfer ducts and combustion chambers.

At the rear of the compressor casing is situated a turbine comprising a rotor wheel 39 connected to shaft 11 by a flange coupling 45 and carrying two rows of rotor blading 38 between which is arranged a row of stator blading 37 projecting inwardly from a built-up turbine stator casing 36 which defines the outer boundary of the annular turbine duct, whose inner boundary is defined by the rim of wheel 39 and an integral external flange 47 of the diaphragm 10d; the latter flange being connected to, and thereby supporting, the turbine stator casing 36, by means of radial webs 35 which may act as guide vanes at the turbine entry. An annular duct 34 (or a number of circumferentially spaced ducts) convey the expanding gases from the combustion chamber to the turbine.

The latter discharges into an annular duct 40 leading to a jet reaction nozzle 46 and defined by an external boundary wall 41 and an inner conical wall or fairing 42 supported from the outer wall 41 by radial webs 44.

A fairing 43 in the form of a boss is attached to the front of diaphragm 14 and provides with the outer wall of transfer duct 31 a streamlined air intake to the booster fan duct.

What I claim as my invention and desire to secure by Letters Patent is:

1. An internal combustion turbine power plant, for installation as an aircraft prime mover, operating on the constant pressure cycle with continuous flow; comprising an axial flow compressor, an axial flow turbine, combustion chamber means intermediate the compressor and turbine as regards the flow of working fluid, transfer duct means and turbine exhaust duct means terminating in jet reaction nozzle means; wherein the compressor comprises a rotor carrying rows of rotor blading, a stator casing carrying rows of stator blading, and rotor and stator shroud elements secured respectively to the rotor and stator blading, the rotor, stator casing and shroud elements together defining a contra-flow compressor flow channel, consisting of two coaxial annular portions nested within one another and intercommunicating through an annular cavity in the rear of the stator casing, the inner portion of the flow channel having a forwardly facing intake opening and constituting a low pressure compressor channel and the outer portion having a forwardly facing outlet and constituting a high pressure compressor channel, both channels being spanned by rows of the mentioned rotor and stator blading, the rows of rotor blading in the outer channel portion being connected to those in the inner channel portion by means of the rotor shroud elements and some at least of the rows of stator blading in the outer channel portion being connected to those in the inner channel portion by means of the stator shroud elements; and wherein the turbine comprises a rotor coaxial with and secured to the rear of the compressor rotor, turbine rotor blading carried by the turbine rotor, a turbine stator casing and turbine stator blading carried thereby; and wherein the compressor stator casing is nested coaxially within the combustion chamber means, through which the flow is from front to rear, the outlet of the outer (high pressure) portion of the compressor flow channel being connected to the front of the combustion chamber means by a part of said transfer duct means shaped to bring about a complete reversal of flow direction, and the rear end of the combustion chamber means being connected by another part of said transfer duct means with the turbine flow channel defined by the turbine stator casing and the turbine rotor, the direction of flow through the turbine being from front to rear.

2. An internal combustion turbine power plant operating on the constant pressure cycle with continuous flow comprising a first multistage axial flow compressor, an axial flow turbine and combustion chamber means intermediate the compressor and turbine as regards the flow of working fluid, said compressor being provided with rows of rotor blading and stator blading, an auxiliary low pressure multistage axial flow compressor nested coaxially within said first compressor, operating in contra-flow with and delivering working fluid into said first compressor, and being provided with fewer rows of rotor blading and stator blading than the first compressor.

3. An internal combustion turbine power plant as claimed in claim 2 including a rotor common to both the first-mentioned compressor and the auxiliary compressor.

4. An internal combustion turbine power plant comprising a multistage axial flow compressor, an axial flow turbine and combustion chamber means intermediate the compressor and turbine as regards the flow of working fluid, said compressor having means defining two coaxially nested annular flow channels, duct means providing interconnection of adjacent ends of said channels, and intake means at the end of the inner of said channels remote from said duct means, rows of stator blading spanning both said channels, a rotor and rows of rotor blading carried thereby and spanning both said channels, there being more rows of rotor blading and of stator blading in the outer than in the inner of said channels.

5. An internal combustion turbine power plant as claimed in claim 4 wherein each row of rotor blades operative in the inner flow channel is connected by shroud ring means with a plurality of rows of rotor blades operative in the outer flow channel.

6. An internal combustion turbine power plant operating on the constant pressure cycle with continuous flow having a first multistage axial flow compressor, an axial flow turbine and combustion chamber means intermediate the compressor and turbine as regards the flow of working fluid, said compressor being provided with rows of rotor blading and stator blading, an auxiliary low pressure multistage axial flow compressor nested coaxially within said first compressor, operating in contra-flow with and delivering working fluid into said first compressor, and being provided with fewer rows of rotor blading and stator blading than the first compressor, and a rotor common to both the first compressor and the auxiliary compressor, each row of rotor blading of the auxiliary compressor being connected by shroud ring means with a plurality of rows of rotor blading of the first-mentioned compressor.

7. In an internal combustion turbine power plant, an axial flow compressor having means defining two co-axially nested annular flow channels, duct means providing inter-connection of adjacent ends of said channels, air intake means at the end of the inner of said channels remote from said duct means, stator blading spanning both said channels, a rotor and rotor blading carried thereby and spanning both said channels, a stator casing carrying rows of inwardly projecting stator blades operative in the outer flow channel and confined thereto, and other rows of inwardly projecting stator blades operative in the outer flow channel and connected by shroud ring means with single rows of stator blades operative in the inner flow channel.

8. An internal combustion turbine power plant comprising an axial flow turbine; a multistage axial flow compressor coaxial with and drivingly connected to said turbine at the upstream side thereof, said compressor comprising a plurality of lower pressure stages having their intake at the end of the compressor remote from the turbine, and a plurality of higher pressure stages coaxially surrounding said lower pressure stages so as to be in contraflow relation thereto, said higher pressure stages receiving air with reversal of flow from the lower pressure stages and having their outlet at the end of the compressor remote from the turbine; and a combustion system coaxially surrounding said higher pressure stages so as to be in contraflow relation thereto, said combustion system receiving air with reversal of flow from the higher pressure compressor stages and discharging into the turbine.

9. An internal combustion turbine power plant as claimed in claim 8, including a rotor common to both the higher and the lower pressure stages of the compressor.

10. An internal combustion turbine power plant as claimed in claim 9, wherein the compressor has more higher pressure than lower pressure stages.

11. A multistage axial flow compressor comprising means defining an inner and an outer annular flow channel coaxially nested one within the other, a duct conecting adjacent ends of said channels at one end thereof, air inlet and outlet means at the ends of the inner and outer channels respectively remote from said duct, said channels progressively decreasing in cross-sectional area from said inlet to said duct and from said duct to said outlet, a plurality of rows of stator blades spanning both said channels, a rotor coaxial with said channels, a plurality of rows of rotor blades carried thereby and spanning said inner channel, a plurality of further rows of rotor blades spanning said outer channel, and a plurality of shroud rings each connecting a plurality of said further rows to each of said rows spanning the inner channel.

ALUN RAYMOND HOWELL.

REFERENCES CITED

The following references are of record in the file of this patent:

UNITED STATES PATENTS

| Number | Name | Date |
|---|---|---|
| 1,672,272 | Moore | June 5, 1928 |
| 2,256,198 | Hahn | Sept. 16, 1941 |
| 2,276,695 | Lavarello | Mar. 17, 1942 |
| 2,318,393 | Honerkamp et al. | May 4, 1943 |
| 2,398,113 | Parrish | Apr. 9, 1946 |
| 2,474,143 | Forsyth | June 21, 1949 |

FOREIGN PATENTS

| Number | Country | Date |
|---|---|---|
| 776,418 | France | Oct. 31, 1934 |
| 579,585 | Germany | July 1, 1933 |